(12) United States Patent
Boyce et al.

(10) Patent No.: US 12,041,250 B2
(45) Date of Patent: Jul. 16, 2024

(54) MULTI-DIMENSIONAL VIDEO TRANSCODING

(71) Applicant: Intel Corporation, Santa Clara, CA (US)

(72) Inventors: Jill Boyce, Portland, OR (US); Basel Salahieh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 16/739,584

(22) Filed: Jan. 10, 2020

(65) Prior Publication Data
US 2020/0154121 A1    May 14, 2020

(51) Int. Cl.
| | |
|---|---|
| *H04N 19/82* | (2014.01) |
| *H04N 19/132* | (2014.01) |
| *H04N 19/40* | (2014.01) |
| *H04N 21/2365* | (2011.01) |
| *H04N 21/4402* | (2011.01) |

(52) U.S. Cl.
CPC .......... *H04N 19/40* (2014.11); *H04N 19/132* (2014.11); *H04N 21/2365* (2013.01); *H04N 21/4402* (2013.01)

(58) Field of Classification Search
CPC .. H04N 19/40; H04N 19/132; H04N 21/2365; H04N 21/4402; H04N 19/82
See application file for complete search history.

(56) References Cited

U.S. PATENT DOCUMENTS

| | | | |
|---|---|---|---|
| 2018/0103199 A1 | 4/2018 | Hendry et al. | |
| 2020/0294271 A1* | 9/2020 | Ilola | .......................... G06T 9/00 |
| 2021/0274226 A1* | 9/2021 | Andrivon | ......... H04N 21/23614 |

FOREIGN PATENT DOCUMENTS

| | | | |
|---|---|---|---|
| GB | 2572996 | 10/2019 | |
| WO | WO-2019202207 A1 * | 10/2019 | ............. G06T 15/04 |

OTHER PUBLICATIONS

Boyce et al.: "Working Draft 1 of Metadata for Immersive Media (Video)", International Organisation for Standardisation, Organisation Internationale De Normalisation ISO/IEC JTC1/SC29/WG11, Coding of Moving Pictures and Audio; ISO/IEC JTC1/SC29/WG11 MPEG2018/M18464, Apr. 4, 2019, Geneva, CH, 33 pages.

Boyce et al.: "Continous Improvement of Study Text of ISO/IEC CD 23090-5 Video-based Point Cloud Compression", May 8, 2019 N18479, Geneva CH, 140 pages.

Boyce et al.: "Information Technology-Coded Representation of Immersive Media-Part 5: Video-based Point Cloud Compression", ISO/IEC JTC 1/SC 29/WG 11; May 2019, Geneva CH, 261 pages.

(Continued)

*Primary Examiner* — Patrick E Demosky
(74) *Attorney, Agent, or Firm* — Hanley, Flight & Zimmerman, LLC

(57) ABSTRACT

An example apparatus for transcoding multi-dimensional video includes a multi-dimensional video decoder to decode a first bitstream of multi-dimensional video. The apparatus also includes a transcoder to transcode the decoded first bitstream to generate transcoded multi-dimensional data. The apparatus also further includes a multi-dimensional video encoder to generate a second bitstream based on the transcoded multi-dimensional data.

21 Claims, 5 Drawing Sheets

(56) References Cited

OTHER PUBLICATIONS

Salahieh, et al.: "Test Model for Immersive Video" International Organisation for Standardisation, Organisation Internationale De Normalisation ISO/IEC JTC1/SC29/WG11, Coding of Moving Pictures and Audio; ISO/IEC JTC1/SC29/WG11 N18470, Geneva, CH-Mar. 2019, 27 pages.

European Patent Office, "European Search Report," mailed in connection with European Patent Application No. 20198439.0, on Feb. 24, 2021, 14 pages.

ISO/IEC, "Test Model for Immersive Video," May 3, 2019, 27 pages. Retrieved from http://phenix.int-evry.fr/mpeg/doc_end_user/documents/126_geneva/wg11/w18470.zipw18470.docx.

ISO/IEC, "Revised Text of ISO/IEC CD 23090-10 Carriage of Video-based Point Cloud Coding Data," Nov. 8, 2019, 41 pages. Retrieved from http://phenix.int-evry.fr/mpeg/doc_end_user/documents/128_Geneva/wg11/18832.zipw18832_Revised Text of ISOIEC CD 23090-10 Carriage of Video-based Point Cloud Coding Data—clean.docx.

Le et al., "Efficient Transcoding and Encryption for Live 360 CCTV," Applied Sciences, vol. 9, No. 4, Feb. 21, 2019, 18 pages.

You et al., "OMAF4CLOUD: Standards-Enabled 360 Video Creation as a Service," Sep. 2019, 9 pages.

Liu et al., "3D Video Transcoding for Virtual Views," Association for Computing Machinery, Oct. 2010, 4 pages.

European Patent Office, "Communication pursuant to Article 94(3) EPC," issued in connection with European Patent Application No. 20 198 439.0-1208, dated Mar. 11, 2024, 8 pages.

\* cited by examiner

MULTI-DIMENSIONAL VIDEO TRANSCODING

BACKGROUND

Video transcoding may be used to convert a first bitstream into a second bitstream with different resolution or bitrate. For example, the second bitstream may be streamed using a network with a bandwidth that may not support the first bitstream, or played back using a device that supports the lower resolution of the second bitstream.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
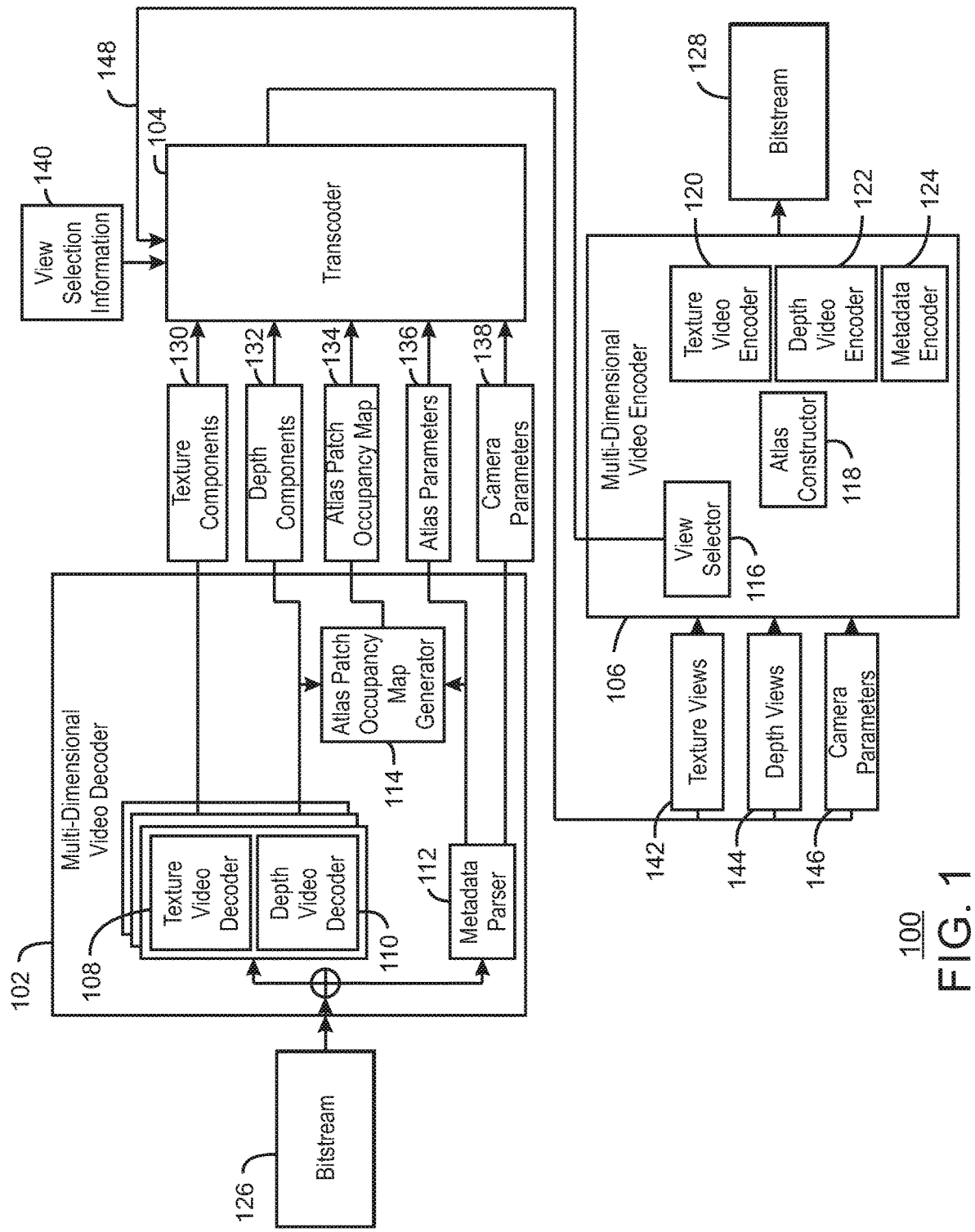
FIG. 1 is a block diagram illustrating an example system for transcoding multi-dimensional video.

Multi-dimensional video, as used herein, refers to video that includes three or more dimensions. For example, volumetric video may include three dimensions, light field video may include four to eight dimensions, and immersive video may have six degrees of freedom amounting to four to five dimensions. Multi-dimensional video may include volumetric video, immersive video, and light field video. Volumetric video includes video recordings where a view in every direction is recorded at the same time. For example, volumetric videos may be captured using an omnidirectional camera or a collection of cameras. During playback on normal flat display, a viewer has control of the viewing direction like a panorama.

Multi-dimensional video may be captured and generated using various techniques, including immersive video, point-cloud based video, and light fields. For example, immersive video codecs enable multiple views of video to be captured and encoded and rendered via a decoder into a particular viewport. A viewport, as used herein, is a projection of texture onto a planar surface of a field of view of an omnidirectional or 3D image or video suitable for display and viewing by the user with a particular viewing position and orientation. For example, the viewport may be a two dimensional view at a particular angle displayed via a head mounted display (HMD) worn by a user to provide different viewing positions and orientations to change the particular view. For example, the view can be rotated, translated, etc. based on the movement of a user wearing the HMD device.

Light fields describe at a given sample point the incoming light from all directions. The light fields may be used in post processing to generate effects such as depth of field as well as allowing the user to move their head slightly.

Various standards for coding various multi-dimensional videos, such as volumetric video or point cloud compressed video, are being developed to encode these various multi-dimensional video types. As one example, the Metadata for Immersive Video (MIV) MPEG-1 Part 12 standard by MPEG, working draft 3 published on October 2019, codes texture and depth video for multiple source views, each at a particular position and orientation, using the existing HEVC video codec. As another example, the Video-based Point Cloud Compression (V-PCC) Algorithm by MPEG, released Nov. 22, 2019, encodes a point cloud sequence, by projecting the point cloud onto planar surfaces, and coding the texture and depth planar projections using existing video codec standards, such as AVC or HEVC.

Video transcoding using standard 2-D video codecs, such as AVC/H.264 or HEVC, is used for efficient distribution of video. For example, a contribution bitstream may be provided at a very high bitrate and high video quality, and be transcoded to a lower bitrate and quality to be used for distribution of the video over constrained bandwidth networks. However, existing 2-D video transcoders may not be able to be directly applied to multi-dimensional video codec standards. For example, existing video codec standards use the same format for input to a video encoder and output of a video decoder, which is an uncompressed (raw) video sequence made up of a sequence of pictures. These video codec standards define normative output conformance points, for which the outputs of any conforming video decoder must exactly match the output of the specified decoder. However, the normatively defined outputs of the various multi-dimensional codec standards are not necessarily in the same format as the inputs to the multi-dimensional encoders.

As one example, the intended output of the reference renderer in the MIV standard is a perspective viewport of the texture, selected based upon a viewer's position and orientation, generated using the outputs of the immersive media decoder. The MIV standard enables the viewer to dynamically move with 6 Degrees of Freedom (6DoF), adjusting position (x, y, z) and orientation (yaw, pitch, roll) within a limited range. For example, the range may be limited to the range supported by a head mounted display or 2-D monitor with positional inputs. However, the conformance point outputs of the MIV reference renderer outputs is not in the same format as the test model for immersive video (TMIV) encoder inputs, and therefore may not be directly applied in a transcoding system.

The present disclosure relates generally to techniques for transcoding multi-dimensional video. Specifically, the techniques described herein include an apparatus, method and system for transcoding multi-dimensional video. An example apparatus includes a multi-dimensional video decoder to decode a first bitstream of multi-dimensional video. The apparatus also includes a transcoder to transcode the decoded first bitstream to generate transcoded volumetric data. The apparatus also further includes a multi-dimensional video encoder to generate a second bitstream based on the transcoded multi-dimensional data. In some examples, the transcoder can render views based on the texture atlases, the depth atlases, the atlas patch occupancy map sequence, the atlas parameters, and the camera parameters of the decoded first bitstream. In various examples, the apparatus includes an atlas resampler to resample the texture atlases and the depth atlases of the decoded first bitstream.

The techniques described herein thus enable reduction of bitrate in a multi-dimensional video bitstream. For example, the bitrate of a bitstream may be reduced to correspond to the available network bandwidth used to distribute the bitstream. In addition, the techniques described herein enable adaptation of the characteristics of the transcoded content to fit the physical constraints of consuming display devices. For example, the characteristics of the bitstream may be adapted when the display devices only support a limited depth of field or viewing range or field of view or in angular, spatial, or depth resolution. Moreover, the techniques may enable reduced complexity of the transcoding operation. For example, a transcoder may be used to resample and select a limited number of views such that encoding the second bitstream enables support for a wide range of consumer devices or adapt to network conditions, such as limited bandwidth.

FIG. 1 is a block diagram illustrating an example system 100 for transcoding multi-dimensional video. The example system 100 can be implemented in the computing device 400 in FIG. 4 using the methods 300 of FIG. 3.

The example system 100 includes a multi-dimensional video decoder 102. The system 100 also includes a transcoding renderer 104 communicatively coupled to the multi-dimensional video decoder 102. The system 100 also further includes a multi-dimensional video encoder 106 communicatively coupled to the transcoding renderer 104. The multi-dimensional video decoder 102 includes a texture video decoder 108, a depth video decoder 110, and a metadata parser 112. The multi-dimensional video decoder 102 also further includes an atlas patch occupancy map generator 114 communicatively coupled to the depth video decoder 110 and the metadata parser 112.

The multi-dimensional video encoder 106 includes a view selector 116. The multi-dimensional video encoder 106 also includes an atlas constructor 118. The multi-dimensional video encoder 106 also further includes a video texture encoder 120, a depth video encoder 122, and a metadata encoder 124.

In the example of FIG. 1, the system 100 can receive a first bitstream 126 and transcode the first bitstream 126 to generate a second bitstream 128. For example, the first bitstream 126 may be a high quality multi-dimensional video bitstream, such as an immersive video bitstream. The second bitstream 128 may be a compressed or lower quality immersive video bitstream. For example, the multi-dimensional video decoder 102 can receive the first bitstream 126 and generate atlases of corresponding texture components 130 and depth components 132. The texture video decoder 108 can generate texture components 130 of atlases from the first bitstream 126. For example, the texture components 130 can include decoded texture pictures. In various examples, the texture video decoder 108 can generate texture atlases 130 by detecting a Coded Video Sequence (CVS) for each texture of a layer pair in the bitstream 126 and decoding the texture into a decoded texture picture.

In various examples, the depth video decoder 110 can generate depth components 132 of atlases from the bitstream 126. For example, the depth video decoder 110 can receive a CVS for each depth layer of a layer pair in the bitstream 126. The depth video decoder 110 can generate a decoded depth picture based on each depth layer. The depth atlases 132 may thus include decoded depth pictures. In some examples, the depth video decoder 110 can generate depth atlases 132 from the related portion of the compressed bitstream. In various examples, the depth atlases 132 and texture atlases 130 may be output as a sequence of decoded picture pairs of synchronized decoded texture pictures and decoded depth pictures. Each of the pairs of texture atlases 130 and synchronized depth atlases 132 is referred to herein as an atlas.

The atlas patch occupancy map generator 114 can generate atlas patch occupancy maps 134 based on the depth atlases 132 from the depth video decoder 110 and atlas parameters 136 from the metadata parser 112. For example, the atlas patch occupancy maps 134 may include a sequence of maps associated with the depth atlases 132 and texture atlases 130. Each of the maps may indicate for each sample position in the texture and depth videos, if a sample position is occupied. For example, a sample position may be occupied if there is a valid value in same pixel location in the atlas that will be used later by a renderer.

In various examples, the metadata parser 112 can parse metadata in the bitstream 126 to detect and output the atlas parameters 136 and camera parameters 138. For example, the atlas parameters 136 can include patches' parameters specifying how each patch extracted from a given view is packed in a given atlas and the entity each patch belongs to along with the grouping and depth occupancy coding parameters. For example, the entity may be an object. The camera parameters can include extrinsic parameters and intrinsic parameters per streamed view along to other parameters related quality of depth maps and the associated entities. For example, extrinsic parameters may include position and rotation parameters. In various examples, intrinsic parameters may include field of view, focal length, and projection type.

The transcoding renderer 104 can receive the texture atlases 130, depth the depth atlases 132, the atlas patch occupancy map 134, the atlas parameters 136, and the camera parameters 138, and view selection information 140 and generate texture views 142, depth views 144, and camera parameters 146. For example, the texture views 142 and depth views 144 may be texture and depth video sequences for multiple views. In various examples, each view may correspond to a particular 6DoF position and orientation. The texture views 142 and depth views 144 may be generated based on the specifications of the client device to use the bitstream 128. In some examples, the transcoding renderer 104 can render the output texture views 142 and depth views 144 to any desired resolution, thus avoiding the use of a separate resampler. In various examples, if transcoder's 2D video encoders encode at a lower resolution, the complexity of the rendering operation may be reduced. For example, the outputted bitstream 128 from the transcoder 104 may be consumed by consumer devices, some of which may be of limited computing capabilities. As one example, if reduce resolution is used, then the complexity of the decoders can also be reduced in the consumer devices. In some examples, the transcoding renderer 104 can also adjust the position and orientation, the field of view, or depth of field of the output texture views 142 and depth views 144. For example, if the system 100 is provided information about the particular display to be used by the client viewer or the client multi-dimensional video decoder capability level, then the resolution, field of view, depth of field values, and the region of interest of the output views can be adapted to match those of the client display or the decoder. In various examples, the target display device may support a view of 1024×720 pixels (720P), 1920×1080 pixels (1080P), or 3840×2160 pixels (4K), among other possible resolutions. The multiple view texture and depth video sequences are used as the inputs to the multi-dimensional video encoder 106.

In some examples, the transcoding renderer 104 can also receive an input view selection information 148. For example, the view selection information input 148 can be used to input different criteria that can be used by the transcoding renderer 104 for the selection of the multiple view positions and orientations output by the renderer, as well as characteristics of the view. The selected views may correspond to some or all of the camera parameters 138 included within bitstream 126, or may differ. The camera parameters 146 for the selected views are output by the transcoding renderer 104 and input to the multi-dimensional video encoder 106. In some examples, the camera parameters 146 of the selected views may be copied from camera parameters 138 in response to detecting that the camera parameters are already present in the bitstream 126. Otherwise, the transcoding renderer 104 can modify or set new camera parameters 146 in case novel views are rendered. For example, the transcoding renderer 104 can filter out some views or set a new set of novel views based on different bandwidth and display requirements and generate camera parameters 146 accordingly.

In some examples, the transcoding renderer 104 can reduce the number of views in bitstream 128 in response to detecting that the transcoder's target output bitrate for bitstream 128 is significantly lower than the input bitrate of bitstream 126. For example, the target output bitrate may differ from the input bitrate of bitstream 126 by greater than a threshold difference. In various examples, the bit-depth of the views can also be reduced from the bit depth used in the original bitstream 126. Rendering multi-dimensional video may be a computationally complex process. Reducing the number of output views to be rendered can significantly reduce the implementation complexity of the system 100. Reducing the number or resolution of the transcoded multi-dimensional video can also reduce the complexity required by the client immersive video decoder, player, and display devices.

In various examples, the view selection information 148 can be determined by a multi-dimensional video service (not shown). For example, the multi-dimensional video service may choose to limit the range of views that are supported by the bitstream. As one example, the multi-dimensional video service may choose to limit the range of views in bitstream 128 to a 90 degree field of view from an original 180 degree field of view in the bitstream 126. In various examples, the range of views may be limited for creative purposes as chosen by a content creator. In some examples, the transcoding may be targeted at a particular viewer. For example, the view selection information 148 can be used to restrict the range of views to be close to a current view position of the viewer. The view selection information 148 can thus also enable a lower latency adaptation of the bitstream for a constrained network or constrained decoder or client capability. In some examples, the view selection information 148 can be used to reduce the number of views to improve rendering fidelity when processing natural content. For example, by utilizing more coherent data from more closely neighboring views, the overall rendering fidelity may be improved.

In some examples, the transcoding renderer 104 can choose to perform more accurate and higher complexity rendering within a certain region of interest of the multi-dimensional video. For example, the transcoding renderer 104 can perform more accurate and higher complexity rendering for closer objects or objects close to the viewer's current view position. As one example, transcoding renderer 104 can render objects with smaller depth values more accurately and with a higher complexity.

The multi-dimensional video encoder 106 can receive the texture views 142, the depth views 144, and the camera parameters 146 and generate the second bitstream 128. In some examples, the view selector 116 of the multi-dimensional video encoder 106 can be used to select a view for the bitstream 128. For example, the view selector 116 may specify a particular view based on a target display device. In some examples, the multi-dimensional video encoder 106 can use the view selector 116 to provide guidance to the transcoding renderer 104 of which views to render based on the utility of the views. For example, the multi-dimensional video encoder 106 can instruct the transcoding renderer 104 to avoid rendering views that the immersive video encoder's 106 view selector 116 chooses to exclude. In various examples, the transcoding renderer 104 can render a larger set of views for a subset of the pictures of a coded video sequence for use by the encoder's view selector 116, and then use that view selector information 148 to reduce the number of views rendered for the other pictures in the same coded video sequence. For example, the transcoding renderer 104 can render a larger set of views for I-frames and use the view selector information 148 for the I-frames to reduce the number of views rendered for the other pictures in the same coded video sequence.

In various examples, the output bitstream 128 may be sent to another device to be decoded into a viewport that may be displayed on a display device, such as an HMD device. For example, the output bitstream 128 may have a lower bitrate than the bitstream 126 and thus transmitted over a network using less resources. In some examples, the resolution of the output bitstream 128 may match the supported resolution of the display device.

The diagram of FIG. 1 is not intended to indicate that the example system 100 is to include all of the components shown in FIG. 1. Rather, the example system 100 can be implemented using fewer or additional components not illustrated in FIG. 1 (e.g., additional bitstreams, transcoding renderers, decoders, encoders, etc.). For example, the immersive video encoder may output multiple bitstreams with different sizes and compressions.

Figure 2:
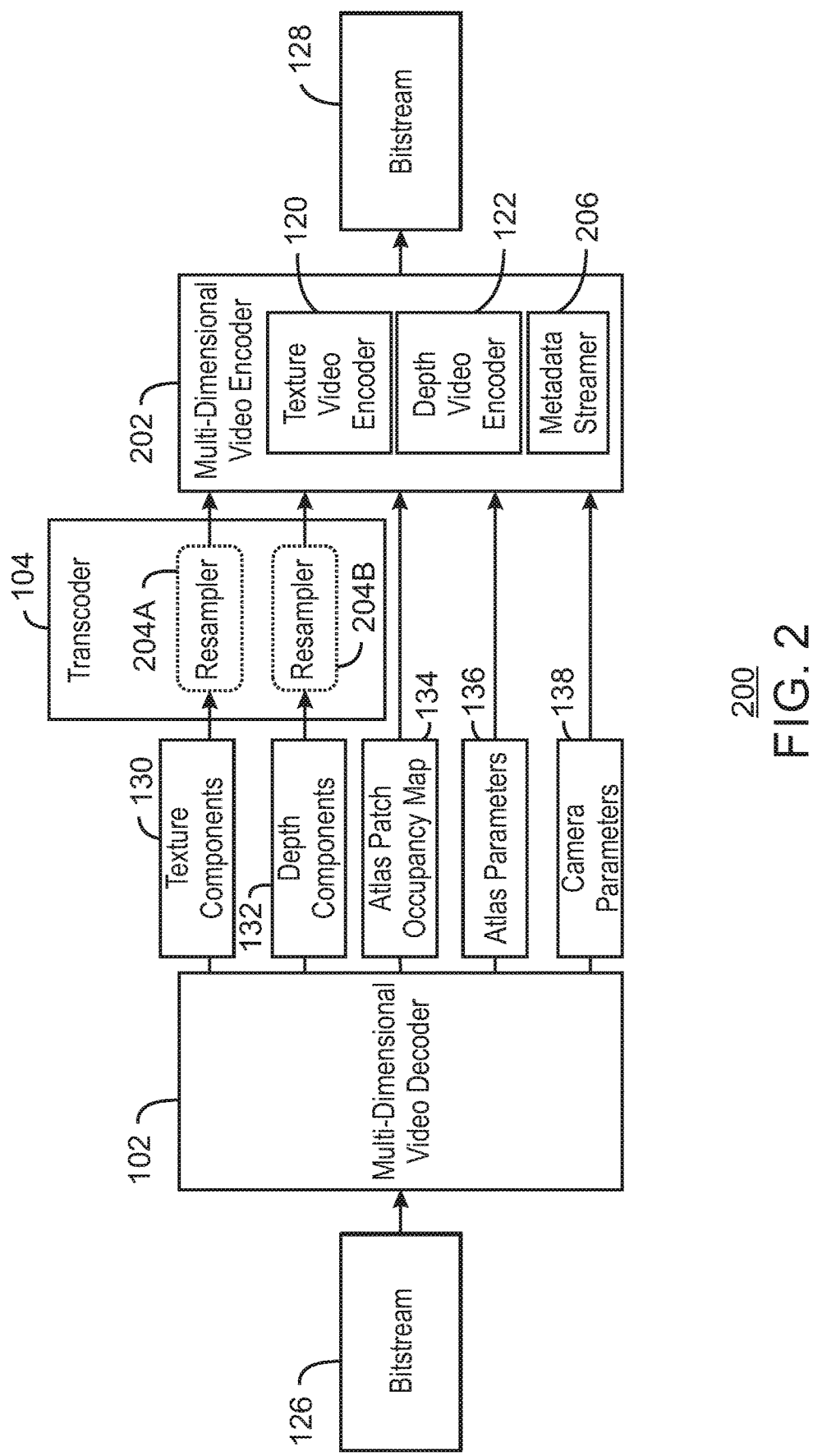
FIG. 2 is a block diagram illustrating another example system for transcoding multi-dimensional video.

FIG. 2 is a block diagram illustrating another example system for transcoding multi-dimensional video. The example system 200 can be implemented in the computing device 400 in FIG. 4 using the method 300 of FIG. 3.

The example system 200 includes similarly numbered elements of FIG. 1. In addition, the system 200 includes an immersive video encoder 202. The system 200 includes a resamplers 204A and 204B communicatively coupled to the immersive video decoder 102 and the immersive video encoder 202. The immersive video encoder 202 of FIG. 2 includes a metadata streamer 206. For example, the metadata streamer 206 may encode metadata or pass metadata from the multi-dimensional video decoder 102 as is.

In the example of FIG. 2, the transcoding process can be simplified in certain cases by avoiding the need to render the views at all. In this example, the same views, atlases, and patches are used in bitstream 128 as are present in bitstream 126. For example, all the atlas component video sequences including the texture atlases 130 and the depth atlases 132 are decoded and re-encoded using just video encoding, optional resampling via resamplers 204A and 204B, and decoding. For example, the resamplers 204A and 204B can perform upscaling or downscaling of texture components and depth components, respectively. In various examples, the metadata including atlas parameters 136 and camera parameters 138 are passed through and multiplexed into the bitstream via the metadata streamer 206. In some examples, if the atlas patch occupancy map sequence 134 is coded separately rather than embedded in the depth components 132, then the layer of the bitstream 126 used for coding the atlas patch occupancy map sequence 134 video sequence could be passed through to the immersive video encoder 202 without re-encoding, or the occupancy map decoded pictures can be output from the immersive video decoder 102 and re-encoded in the immersive video encoder 202. For example, the MPEG Immersive Video standard embeds the occupancy maps within the depth, while V-PCC standard streams the occupancy maps in a separate channel.

As one example, the V-PCC draft standard specifies a decoding process where the outputs are a set of decoded video streams, corresponding to the texture, geometry, occupancy map, and any attributes, as well as information about the point cloud sequence, and the decoded patch data information. These outputs can be used to perform the 3D point cloud reconstruction process, which is specified, but not always required for conformance. However, when transcoding is applied to a V-PCC bitstream, there is no need to generate a point cloud as part of the decoding process. Instead, the decoded texture and depth planar projection videos 130 and 132 can be input to a V-PCC encoder 202, bypassing the stage where projections are formed from the point cloud. In the V-PCC draft specification, an occupancy map video sequence 134 is coded that indicates, for each sample position in the texture and depth videos, if the sample position is occupied. In various examples, a V-PCC encoder used within the transcoder system 200 can be modified to take as input the occupancy map output 134 from the V-PCC decoder.

The diagram of FIG. 2 is not intended to indicate that the example system 200 is to include all of the components shown in FIG. 2. Rather, the example system 200 can be implemented using fewer or additional components not illustrated in FIG. 2 (e.g., additional bitstreams, resamplers, decoders, encoders, etc.). For example, the system 200 may not include resamplers 204A and 204B in some implementations.

Figure 3:
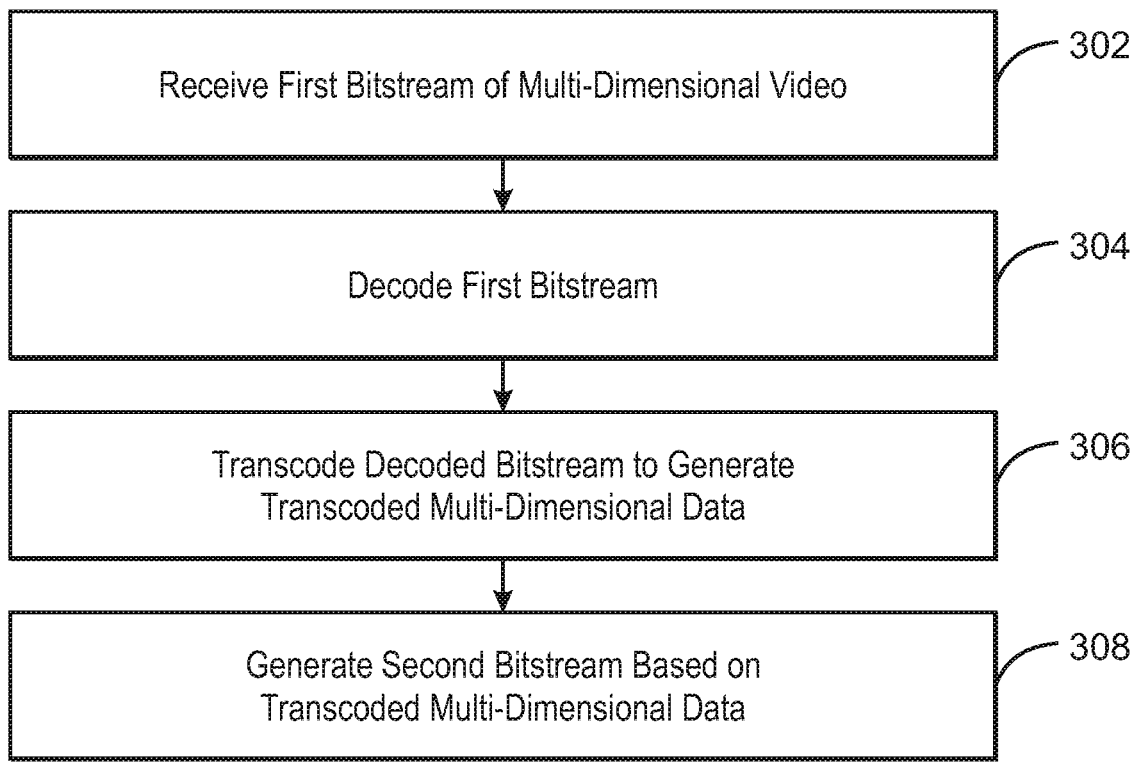
FIG. 3 is a flow chart illustrating a method for transcoding multi-dimensional video.

FIG. 3 is a flow chart illustrating a method for transcoding multi-dimensional video. The example method 300 can be implemented in the systems 100 or 200 of FIGS. 1 and 2, the computing device 400 of FIG. 4, or the computer readable media 500 of FIG. 5.

At block 302, a processor receives a first bitstream of multi-dimensional video. For example, the multi-dimensional video may be a compressed immersive video, point-cloud based video, or light field video.

At block 304, the processor decodes the first bitstream. For example, the processor can decode the first bitstream into texture atlases, depth atlases, an atlas patch occupancy map sequence, atlas parameters, and camera parameters, or any combination thereof.

At block 306, the processor transcodes the decoded first bitstream to generate transcoded multi-dimensional data. In some examples, the processor can render views based on the texture atlases, depth atlases, an atlas patch occupancy map sequence, atlas parameters, and camera parameters. The processor can then resample the views. For example, the processor can upscale or downscale the views. In various examples, the rendered views may be a subset of views in the first bitstream. For example, the processor can render a number of views based on received view selector information. In some examples, the processor can reduce a range or number of views from the first bitstream included in the second bitstream. For example, the processor can limit a range of views to views within a particular field of view associated with a display device. In various examples, the processor can render an identified region of interest in the first bitstream with more accuracy or higher complexity than other regions in the second bitstream. For example, the region of interest may be an object that is closer to the viewer. In some examples, the processor can render a larger set of views for a subset of pictures in the second bitstream, generate view selector information based on the subset of pictures, and reduce a number of views rendered for the other pictures in the second bitstream. For example, the processor can render a larger set of views for I-frames in the second bitstream while reducing the number of views for other frames in the second bitstream. In various examples, the views can be used to generate updated atlases. In some examples, the processor can directly generate resampled texture atlases and resampled depth atlases from the decoded texture atlases and the decoded depth atlases. For example, the processor can generate resampled texture atlases and resampled depth atlases from the decoded texture atlases and the decoded depth atlases without rendering any views in response to detecting that the second bitstream is to include the same views with a lower resolution or bitrate. In various examples, the processor can also generate metadata to be included in the second bitstream. In some examples, the processor can copy metadata from the first bitstream. In other examples, the processor can generate metadata to be included in the second bitstream based on the transcoded multi-dimensional data. For example, the metadata may be generated based on the rendered views used to generate updated atlases. If renderer in the transcoder is dropping some view or synthesizing new ones, then the metadata may be updated accordingly.

At block 308, the processor generates a second bitstream based on the transcoded multi-dimensional data. For example, the second bitstream can then be transmitted to a second processor for display. As one example, the second processor may be in a head mounted display device. In various examples, the second bitstream may be of a lower bitrate than the first bitstream. Thus, the second bitstream may be more efficiently transmitted to the second processor. For example, the second bitstream may be transmitted to the second processor over any suitable network connection.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
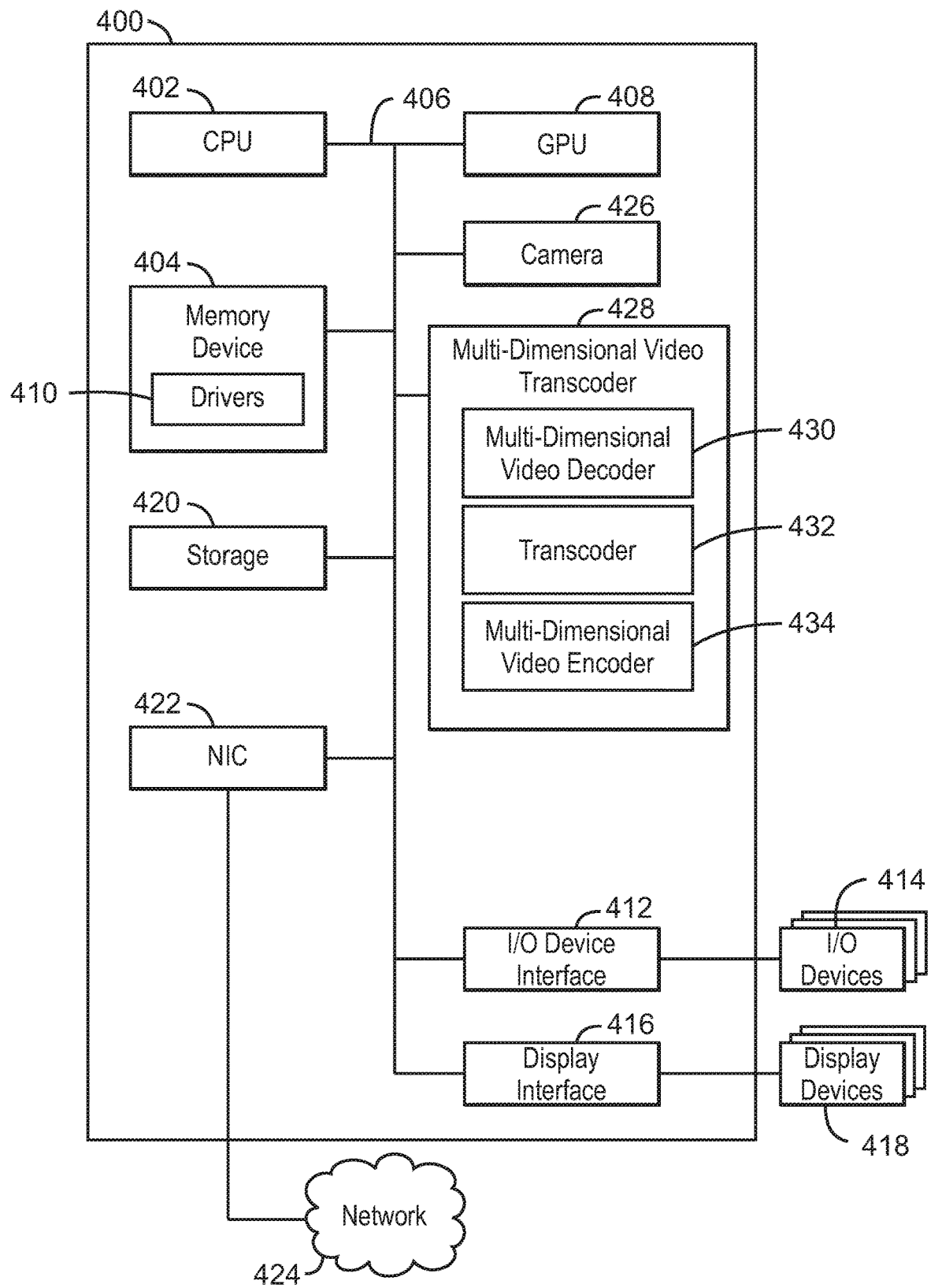
FIG. 4 is block diagram illustrating an example computing device that can transcode multi-dimensional video.

Referring now to FIG. 4, a block diagram is shown illustrating an example computing device that can transcode multi-dimensional video. The computing device 400 may be, for example, a laptop computer, desktop computer, tablet computer, mobile device, or wearable device, among others. In some examples, the computing device 400 may be a cloud computing node. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. In some examples, the CPU 402 may be a system-on-chip (SoC) with a multi-core processor architecture. In some examples, the CPU 402 can be a specialized digital signal processor (DSP) used for image processing. The memory device 404 can include random access memory (RAM), read only memory (ROM), flash memory, or any other suitable memory systems. For example, the memory device 404 may include dynamic random access memory (DRAM).

The memory device 404 can include random access memory (RAM), read only memory (ROM), flash memory, or any other suitable memory systems. For example, the memory device 404 may include dynamic random access memory (DRAM).

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The memory device 404 can include random access memory (RAM), read only memory (ROM), flash memory, or any other suitable memory systems. For example, the memory device 404 may include dynamic random access memory (DRAM). The memory device 404 may include device drivers 410 that are configured to execute the instructions for training multiple convolutional neural networks to perform sequence independent processing. The device drivers 410 may be software, an application program, application code, or the like.

The CPU 402 may also be connected through the bus 406 to an input/output (I/O) device interface 412 configured to connect the computing device 400 to one or more I/O devices 414. The I/O devices 414 may include, for example, a keyboard and a pointing device, wherein the pointing device may include a touchpad or a touchscreen, among others. The I/O devices 414 may be built-in components of the computing device 400, or may be devices that are externally connected to the computing device 400. In some examples, the memory 404 may be communicatively coupled to I/O devices 414 through direct memory access (DMA).

The CPU 402 may also be linked through the bus 406 to a display interface 416 configured to connect the computing device 400 to a display device 418. The display device 418 may include a display screen that is a built-in component of the computing device 400. The display device 418 may also include a computer monitor, television, or projector, among others, that is internal to or externally connected to the computing device 400.

The computing device 400 also includes a storage device 420. The storage device 420 is a physical memory such as a hard drive, an optical drive, a thumbdrive, an array of drives, a solid-state drive, or any combinations thereof. The storage device 420 may also include remote storage drives.

The computing device 400 may also include a network interface controller (NIC) 422. The NIC 422 may be configured to connect the computing device 400 through the bus 406 to a network 424. The network 424 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 400 further includes a camera 426. For example, the camera 426 may include one or more imaging sensors. In some example, the camera 426 may include a processor to generate multi-dimensional video, such as immersive video, point-cloud based video, or light field video.

The computing device 400 further includes a multi-dimensional video transcoder 428. The multi-dimensional video transcoder 428 can be used to transcode multi-dimensional video. For example, the multi-dimensional video may be an immersive video, a point-cloud video, or a light field video. The multi-dimensional video transcoder 428 can include a multi-dimensional video decoder 430, a transcoder 432, and a multi-dimensional video encoder 434. In some examples, each of the components 430-434 of the immersive video transcoder 428 may be a microcontroller, embedded processor, or software module. The multi-dimensional video decoder 430 can decode a first bitstream of multi-dimensional video. For example, the decoded first bitstream can include texture atlases, depth atlases, an atlas patch occupancy map sequence, atlas parameters, and camera parameters, or any combination thereof. The transcoder 432 can transcode the decoded first bitstream to generate transcoded multi-dimensional data. For example, the transcoded multi-dimensional data can include a texture view, a depth view, and a set of camera parameters. The set of camera parameters in the transcoded multi-dimensional data may represent the source views or those newly rendered by the transcoder based on the bandwidth or display specifications. In some examples, the transcoder 432 can render a view based on the decoded first bitstream. For example, the transcoder 432 can generate views based on the transcoded multi-dimensional data, resample the generated views, and generate resampled texture atlases and resampled depth atlases based on the resampled views. In some examples, the transcoder 432 can reduce a range or number of views from the first bitstream included in the second bitstream. For example, the transcoder 432 can render a subset of views based on the generated view selection information from the multi-dimensional video encoder 434. In various examples, the transcoder 432 can directly resample texture atlases and depth atlases of the decoded first bitstream. The multi-dimensional video encoder 434 can generate a second bitstream based on the transcoded multi-dimensional data. In some examples, the multi-dimensional video encoder 434 can generate view selection information. For example, the multi-dimensional video encoder 434 can include a view selector (not shown) to generate view selection information. In various examples, the multi-dimensional video encoder 434 can include an atlas constructor to generate atlases based on a subset of views and a set of camera parameters from the transcoder. For example, the multi-dimensional video encoder 434 can generate the second bitstream based on the atlases. In some examples, the multi-dimensional video encoder 434 can include a metadata streamer to copy metadata from the decoded first bitstream and multiplex the copied metadata into the second bitstream. Thus, in various examples, if the multi-dimensional video decoder 430 or the transcoder 432 outputs views, then multi-dimensional video encoder 434 can encode the views into atlases. In some examples, if the multi-dimensional video decoder 430 or the transcoder 432 outputs modified atlases then the multi-dimensional video encoder 434 within the immersive video transcoder 428 may be bypassed.

The block diagram of FIG. 4 is not intended to indicate that the computing device 400 is to include all of the components shown in FIG. 4. Rather, the computing device 400 can include fewer or additional components not illustrated in FIG. 4, such as additional buffers, additional processors, and the like. For example, in various embodiments, the functionality of the transcoder 432 may be included in the multi-dimensional video decoder 430 or the multi-dimensional video encoder 434. The computing device 400 may include any number of additional components not shown in FIG. 4, depending on the details of the specific implementation. Furthermore, any of the functionalities of the multi-dimensional video decoder 430, the transcoder 432, and the multi-dimensional video encoder 434, may be partially, or entirely, implemented in hardware and/or in the processor 402. For example, the functionality may be implemented with an application specific integrated circuit, in logic implemented in the processor 402, or in any other device. In addition, any of the functionalities of the CPU 402 may be partially, or entirely, implemented in hardware and/or in a processor. For example, the functionality of the multi-dimensional video transcoder 428 may be implemented with an application specific integrated circuit, in logic implemented in a processor, in logic implemented in a specialized graphics processing unit such as the GPU 408, or in any other device.

Figure 5:
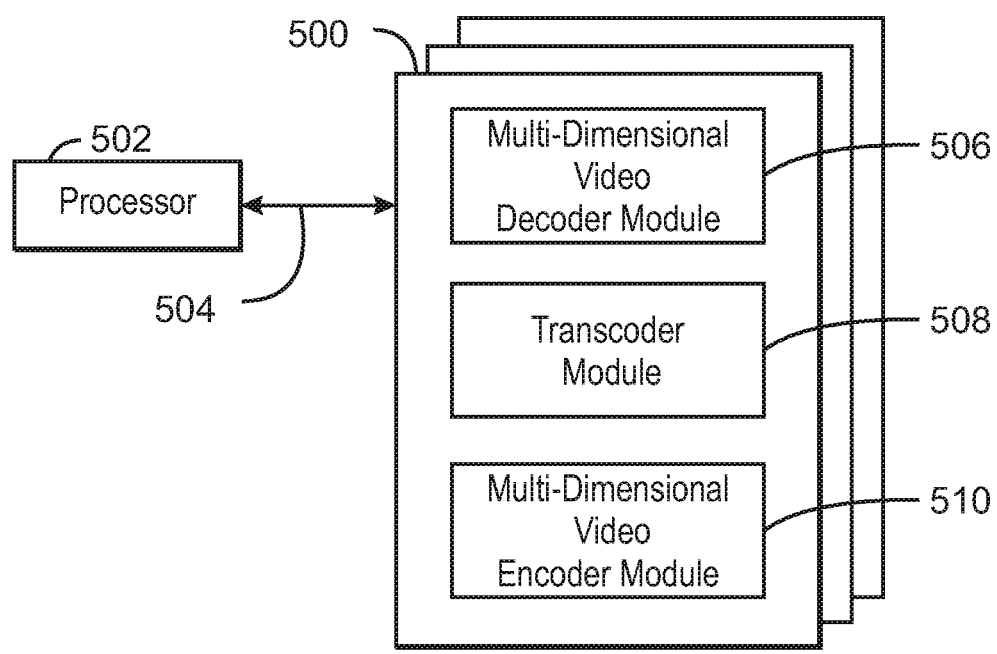
FIG. 5 is a block diagram showing computer readable media that store code for transcoding multi-dimensional video.

FIG. 5 is a block diagram showing computer readable media 500 that store code for transcoding multi-dimensional video. The computer readable media 500 may be accessed by a processor 502 over a computer bus 504. Furthermore, the computer readable medium 500 may include code configured to direct the processor 502 to perform the methods described herein. In some embodiments, the computer readable media 500 may be non-transitory computer readable media. In some examples, the computer readable media 500 may be storage media.

The various software components discussed herein may be stored on one or more computer readable media 500, as indicated in FIG. 5. For example, a volumetric video decoder module 506 may be configured to decode a first bitstream of volumetric video. A transcoder module 508 may be configured to transcode the decoded first bitstream to generate transcoded volumetric data. In some examples, the transcoder module 508 may be configured to render a view based on the decoded first bitstream. In some examples, the transcoder module 508 may be configured to render a subset of views based on the view selection information. For example, the view selection information may be received from the volumetric video encoder module 510. In various examples, the transcoder module 508 may be configured to reduce a range or number of views from the first bitstream included in the second bitstream. In some examples, the transcoder module 508 may be configured to copy metadata from the first bitstream to be used in the second bitstream. In various examples, the transcoder module 508 may be configured to generate metadata for the second bitstream based on the transcoded multi-dimensional data. A volumetric video encoder module 510 may be configured to generate a second bitstream based on the transcoded volumetric data. For example, the volumetric video encoder module 510 may be configured to generate atlases based on a subset of views and a set of camera parameters. The volumetric video encoder module 510 may be configured to generate the second bitstream based on the atlases. In some examples, the volumetric video encoder module 510 may be configured to generate view selection information. In some examples, the volumetric video encoder module 510 may be configured to render an identified region of interest in the first bitstream with more accuracy or higher complexity than other regions in the second bitstream. In various examples, the volumetric video encoder module 510 may be configured to render a larger set of views for a subset of pictures in the second bitstream, generate view selector information based on the subset of pictures, and reduce a number of views rendered for the other pictures in the second bitstream. In some examples, the volumetric video encoder module 510 may be configured to transmit the second bitstream to a second processor for display.

The block diagram of FIG. 5 is not intended to indicate that the computer readable media 500 is to include all of the components shown in FIG. 5. Further, the computer readable media 500 may include any number of additional components not shown in FIG. 5, depending on the details of the specific implementation.

EXAMPLES

Example 1 is an apparatus for transcoding multi-dimensional video. The apparatus includes a multi-dimensional video decoder to decode a first bitstream of multi-dimensional video. The apparatus also includes a transcoder to transcode the decoded first bitstream to generate transcoded multi-dimensional data. The apparatus further includes a multi-dimensional video encoder to generate a second bitstream based on the transcoded multi-dimensional data.

Example 2 includes the apparatus of example 1, including or excluding optional features. In this example, the decoded first bitstream includes texture atlases, depth atlases, an atlas patch occupancy map sequence, atlas parameters, and camera parameters. The transcoder is to render a view based on the decoded first bitstream.

Example 3 includes the apparatus of any one of examples 1 to 2, including or excluding optional features. In this example, the multi-dimensional video encoder includes a view selector to generate view selection information. The transcoder is to render a subset of views based on the view selection information.

Example 4 includes the apparatus of any one of examples 1 to 3, including or excluding optional features. In this example, the multi-dimensional video encoder includes an atlas constructor to generate atlases based on a subset of views and a second set of camera parameters from the transcoder. The multi-dimensional video encoder is to generate the second bitstream based on the atlases.

Example 5 includes the apparatus of any one of examples 1 to 4, including or excluding optional features. In this example, the transcoded multi-dimensional data includes a texture view, a depth view, and a set of camera parameters.

Example 6 includes the apparatus of any one of examples 1 to 5, including or excluding optional features. In this example, the transcoder is to reduce a range or number of views from the first bitstream included in the second bitstream.

Example 7 includes the apparatus of any one of examples 1 to 6, including or excluding optional features. In this example, the transcoder is to directly resample texture atlases and depth atlases of the decoded first bitstream.

Example 8 includes the apparatus of any one of examples 1 to 7, including or excluding optional features. In this example, the transcoder is to generate views based on the transcoded multi-dimensional data, resample the generated views, and generate resampled texture atlases and resampled depth atlases based on the resampled views.

Example 9 includes the apparatus of any one of examples 1 to 8, including or excluding optional features. In this example, the multi-dimensional video encoder includes a metadata streamer to copy metadata from the decoded first bitstream and multiplex the copied metadata into the second bitstream.

Example 10 includes the apparatus of any one of examples 1 to 9, including or excluding optional features. In this example, the multi-dimensional video decoder or the multi-dimensional video encoder includes the transcoder.

Example 11 is a method for transcoding multi-dimensional video. The method includes receiving, via a processor, a first bitstream of multi-dimensional video. The method also includes decoding, via the processor, the first bitstream. The method further includes transcoding, via the processor, the decoded first bitstream to generate transcoded multi-dimensional data; and generating, via the processor, a second bitstream based on the transcoded multi-dimensional data.

Example 12 includes the method of example 11, including or excluding optional features. In this example, decoding the first bitstream includes generating texture atlases, depth atlases, an atlas patch occupancy map sequence, atlas parameters, and camera parameters.

Example 13 includes the method of any one of examples 11 to 12, including or excluding optional features. In this example, the method includes resampling, via the processor, texture atlases and the depth atlases of the decoded first bitstream to generate resampled texture atlases and resampled depth atlases.

Example 14 includes the method of any one of examples 11 to 13, including or excluding optional features. In this example, the method includes rendering, via the processor, a view based on the texture atlases, depth atlases, an atlas patch occupancy map sequence, atlas parameters, and camera parameters.

Example 15 includes the method of any one of examples 11 to 14, including or excluding optional features. In this example, the method includes reducing a range or number of views from the first bitstream included in the second bitstream.

Example 16 includes the method of any one of examples 11 to 15, including or excluding optional features. In this example, the method includes rendering an identified region of interest in the first bitstream with more accuracy or higher complexity than other regions in the second bitstream.

Example 17 includes the method of any one of examples 11 to 16, including or excluding optional features. In this example, the method includes rendering a larger set of views for a subset of pictures in the second bitstream, generating view selector information based on the subset of pictures, and reducing a number of views rendered for the other pictures in the second bitstream.

Example 18 includes the method of any one of examples 11 to 17, including or excluding optional features. In this example, the method includes copying metadata from the first bitstream to be used in the second bitstream.

Example 19 includes the method of any one of examples 11 to 18, including or excluding optional features. In this example, the method includes generating metadata for the second bitstream based on the transcoded multi-dimensional data.

Example 20 includes the method of any one of examples 11 to 19, including or excluding optional features. In this example, the method includes transmitting the second bitstream to a second processor for display.

Example 21 is at least one computer readable medium for transcoding multi-dimensional video having instructions stored therein that direct the processor to decode a first bitstream of multi-dimensional video. The computer-readable medium includes instructions that direct the processor to transcode the decoded first bitstream to generate transcoded multi-dimensional data. The computer-readable medium includes instructions that direct the processor to generate a second bitstream based on the transcoded multi-dimensional data.

Example 22 includes the computer-readable medium of example 21, including or excluding optional features. In this example, the computer-readable medium includes instructions to render a view based on the decoded first bitstream.

Example 23 includes the computer-readable medium of any one of examples 21 to 22, including or excluding optional features. In this example, the computer-readable medium includes instructions to generate view selection information. The processor is to render a subset of views based on the view selection information.

Example 24 includes the computer-readable medium of any one of examples 21 to 23, including or excluding optional features. In this example, the computer-readable medium includes instructions to generate atlases based on a subset of views and a set of camera parameters. The processor is to generate the second bitstream based on the atlases.

Example 25 includes the computer-readable medium of any one of examples 21 to 24, including or excluding optional features. In this example, the computer-readable medium includes instructions to reduce a range or number of views from the first bitstream included in the second bitstream.

Example 26 includes the computer-readable medium of any one of examples 21 to 25, including or excluding optional features. In this example, the computer-readable medium includes instructions to render an identified region of interest in the first bitstream with more accuracy or higher complexity than other regions in the second bitstream.

Example 27 includes the computer-readable medium of any one of examples 21 to 26, including or excluding optional features. In this example, the computer-readable medium includes instructions to render a larger set of views for a subset of pictures in the second bitstream, generate view selector information based on the subset of pictures, and reduce a number of views rendered for the other pictures in the second bitstream.

Example 28 includes the computer-readable medium of any one of examples 21 to 27, including or excluding optional features. In this example, the computer-readable medium includes instructions to copy metadata from the first bitstream to be used in the second bitstream.

Example 29 includes the computer-readable medium of any one of examples 21 to 28, including or excluding optional features. In this example, the computer-readable medium includes instructions to generate metadata for the second bitstream based on the transcoded multi-dimensional data.

Example 30 includes the computer-readable medium of any one of examples 21 to 29, including or excluding optional features. In this example, the computer-readable medium includes instructions to transmit the second bitstream to a second processor for display.

Example 31 is a system for transcoding multi-dimensional video. The system includes a multi-dimensional video decoder to decode a first bitstream of multi-dimensional video. The system also includes a transcoder to transcode the decoded first bitstream to generate transcoded multi-dimensional data. The system further includes a multi-dimensional video encoder to generate a second bitstream based on the transcoded multi-dimensional data.

Example 32 includes the system of example 31, including or excluding optional features. In this example, the decoded first bitstream includes texture atlases, depth atlases, an atlas patch occupancy map sequence, atlas parameters, and camera parameters. The transcoder is to render a view based on the decoded first bitstream.

Example 33 includes the system of any one of examples 31 to 32, including or excluding optional features. In this example, the multi-dimensional video encoder includes a view selector to generate view selection information. The transcoder is to render a subset of views based on the view selection information.

Example 34 includes the system of any one of examples 31 to 33, including or excluding optional features. In this example, the multi-dimensional video encoder includes an atlas constructor to generate atlases based on a subset of views and a second set of camera parameters from the transcoder. The multi-dimensional video encoder is to generate the second bitstream based on the atlases.

Example 35 includes the system of any one of examples 31 to 34, including or excluding optional features. In this example, the transcoded multi-dimensional data includes a texture view, a depth view, and a set of camera parameters.

Example 36 includes the system of any one of examples 31 to 35, including or excluding optional features. In this example, the transcoder is to reduce a range or number of views from the first bitstream included in the second bitstream.

Example 37 includes the system of any one of examples 31 to 36, including or excluding optional features. In this example, the transcoder is to directly resample texture atlases and depth atlases of the decoded first bitstream.

Example 38 includes the system of any one of examples 31 to 37, including or excluding optional features. In this example, the transcoder is to generate views based on the transcoded multi-dimensional data, resample the generated views, and generate resampled texture atlases and resampled depth atlases based on the resampled views.

Example 39 includes the system of any one of examples 31 to 38, including or excluding optional features. In this example, the multi-dimensional video encoder includes a metadata streamer to copy metadata from the decoded first bitstream and multiplex the copied metadata into the second bitstream.

Example 40 includes the system of any one of examples 31 to 39, including or excluding optional features. In this example, the multi-dimensional video decoder or the multi-dimensional video encoder includes the transcoder.

Example 41 is a system for transcoding multi-dimensional video. The system includes means for decoding a first bitstream of multi-dimensional video. The system also includes means for transcoding the decoded first bitstream to generate transcoded multi-dimensional data. The system further includes means for generating a second bitstream based on the transcoded multi-dimensional data.

Example 42 includes the system of example 41, including or excluding optional features. In this example, the decoded first bitstream includes texture atlases, depth atlases, an atlas patch occupancy map sequence, atlas parameters, and camera parameters. The means for transcoding the decoded first bitstream is to render a view based on the decoded first bitstream.

Example 43 includes the system of any one of examples 41 to 42, including or excluding optional features. In this example, the multi-dimensional video encoder includes a view selector to generate view selection information. The means for transcoding the decoded first bitstream is to render a subset of views based on the view selection information.

Example 44 includes the system of any one of examples 41 to 43, including or excluding optional features. In this example, the system includes means for generating generate atlases based on a subset of views and a second set of camera parameters from the means for transcoding the decoded first bitstream. The means for generating the second bitstream is to generate the second bitstream based on the atlases.

Example 45 includes the system of any one of examples 41 to 44, including or excluding optional features. In this example, the transcoded multi-dimensional data includes a texture view, a depth view, and a set of camera parameters.

Example 46 includes the system of any one of examples 41 to 45, including or excluding optional features. In this example, the means for transcoding the decoded first bitstream is to reduce a range or number of views from the first bitstream included in the second bitstream.

Example 47 includes the system of any one of examples 41 to 46, including or excluding optional features. In this example, the means for transcoding the decoded first bitstream is to directly resample texture atlases and depth atlases of the decoded first bitstream.

Example 48 includes the system of any one of examples 41 to 47, including or excluding optional features. In this example, the means for transcoding the decoded first bitstream is to generate views based on the transcoded multi-dimensional data, resample the generated views, and generate resampled texture atlases and resampled depth atlases based on the resampled views.

Example 49 includes the system of any one of examples 41 to 48, including or excluding optional features. In this example, the means for generating the second bitstream includes a metadata streamer to copy metadata from the decoded first bitstream and multiplex the copied metadata into the second bitstream.

Example 50 includes the system of any one of examples 41 to 49, including or excluding optional features. In this example, the means for transcoding the decoded first bitstream includes a multi-dimensional video decoder or the multi-dimensional video encoder.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for transcoding multi-dimensional video, the apparatus comprising:
   interface circuitry to receive an input bitstream of multi-dimensional video;
   instructions; and
   processor circuitry to operated based on the instructions to:
      cause the input bitstream of multi-dimensional video to be decoded;
      detect that an output bitrate of an output bitstream is to be lower than an input bit rate of the input bitstream by at least a threshold difference;
      transcode the decoded input bitstream to generate transcoded multi-dimensional data having a reduced number of views relative to the input bitstream in response to detecting the output bitrate is to be lower than the input bit rate by at least the threshold difference;
      cause the output bitstream to be generated based on the transcoded multi-dimensional data;
      parse metadata from the decoded input bitstream; and
      cause the parsed metadata to be multiplexed into the output bitstream.

2. The apparatus of claim 1, wherein the decoded input bitstream includes texture atlases, depth atlases, an atlas patch occupancy map sequence, atlas parameters, and camera parameters, and the processor circuitry is to render a view based on the decoded input bitstream.

3. The apparatus of claim 1, wherein the processor circuitry is to render a subset of views based on view selection information.

4. The apparatus of claim 1, wherein the processor circuitry is to obtain atlases based on a subset of views and a second set of camera parameters, and cause the output bitstream to be generated based on the atlases.

5. The apparatus of claim 1, wherein the transcoded multi-dimensional data includes a texture view, a depth view, and a set of camera parameters.

6. The apparatus of claim 1, wherein the processor circuitry is to reduce, relative to the input bitstream, a range of views included in the output bitstream.

7. The apparatus of claim 1, wherein the processor circuitry is to directly resample texture atlases and depth atlases of the decoded input bitstream.

8. The apparatus of claim 1, wherein the processor circuitry is to generate views based on the transcoded multi-dimensional data, resample the generated views, and generate resampled texture atlases and resampled depth atlases based on the resampled views.

9. A method for transcoding multi-dimensional video, the method comprising:
   decoding an input bitstream of multi-dimensional video;
   detecting, with one or more processor circuits, that an output bitrate of an output bitstream is to be lower than an input bit rate of the input bitstream by at least a threshold difference;
   transcoding, with the one or more processor circuits, the decoded input bitstream to generate transcoded multi-dimensional data having a reduced number of views relative to the input bitstream in response to detecting the output bitrate is to be lower than the input bit rate by at least the threshold difference;
   generating the output bitstream based on the transcoded multi-dimensional data;
   parsing first metadata from the decoded input bitstream;
   generating second metadata based on the transcoded multi-dimensional data; and
   multiplexing the first metadata and the second metadata with the output bitstream.

10. The method of claim 9, wherein the decoding of the input bitstream includes generating texture atlases, depth atlases, an atlas patch occupancy map sequence, atlas parameters, and camera parameters.

11. The method of claim 9, including resampling texture atlases and depth atlases of the decoded input bitstream to generate resampled texture atlases and resampled depth atlases.

12. The method of claim 9, including rendering a view based on texture atlases, depth atlases, an atlas patch occupancy map sequence, atlas parameters, and camera parameters.

13. The method of claim 9, including reducing, relative to the input bitstream, a range of views included in the output bitstream.

14. The method of claim 9, including rendering an identified region of interest in the input bitstream with more accuracy or higher complexity than other regions in the output bitstream.

15. The method of claim 9, including rendering a larger set of views for a subset of pictures in the output bitstream, generating view selector information based on the subset of pictures, and reducing a number of views rendered for other pictures in the output bitstream.

16. The method of claim 9, including transmitting the output bitstream to a second processor for display.

17. At least one computer readable memory device for transcoding multi-dimensional video, the computer readable memory device comprising instructions to cause a computing device to at least:
   decode an input bitstream of multi-dimensional video;
   detect that an output bitrate of an output bitstream is to be lower than an input bit rate of the input bitstream by at least a threshold difference;
   transcode the decoded input bitstream to generate transcoded multi-dimensional data having a reduced number of views relative to the input bitstream in response to detecting the output bitrate is to be lower than the input bit rate by at least the threshold difference;
   generate the output bitstream based on the transcoded multi-dimensional data;
   parse first metadata from the decoded input bitstream;
   generate second metadata based on the transcoded multi-dimensional data; and multiplex the first metadata and the second metadata with the output bitstream.

18. The at least one computer readable memory device of claim 17, wherein the instructions are to cause the computing device to render a view based on the decoded input bitstream.

19. The at least one computer readable memory device of claim 17, wherein the instructions are to cause the computing device to generate view selection information, and render a subset of views based on the view selection information.

20. The at least one computer readable memory device of claim 17, wherein the instructions are to cause the computing device to generate atlases based on a subset of views and a set of camera parameters, and generate the output bitstream based on the atlases.

21. The at least one computer readable memory device of claim 17, wherein the instructions are to cause the computing device to reduce, relative to the input bitstream, a range of views included in the output bitstream.

* * * * *